(12) United States Patent
Kruzeniski et al.

(10) Patent No.: US 9,323,424 B2
(45) Date of Patent: *Apr. 26, 2016

(54) COLUMN ORGANIZATION OF CONTENT

(71) Applicant: Microsoft Corporation, Redmond, WA (US)

(72) Inventors: Michael J. Kruzeniski, Seattle, WA (US); Paula Guntaur, Seattle, WA (US); Brian M. Wilson, Mercer Island, WA (US); Chad Aron Voss, Seattle, WA (US)

(*) Notice: Subject to any disclaimer, the term of this patent is extended or adjusted under 35 U.S.C. 154(b) by 406 days.

This patent is subject to a terminal disclaimer.

(21) Appl. No.: 13/835,603

(22) Filed: Mar. 15, 2013

(65) Prior Publication Data

US 2014/0109005 A1 Apr. 17, 2014

Related U.S. Application Data

(63) Continuation of application No. 12/469,419, filed on May 20, 2009, now Pat. No. 8,411,046.

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*G06F 3/0482* (2013.01)
*G06F 3/0488* (2013.01)
*H04M 1/2745* (2006.01)

(52) U.S. Cl.
CPC ............ *G06F 3/0482* (2013.01); *G06F 3/0488* (2013.01); *G06F 3/04883* (2013.01);
(Continued)

(58) Field of Classification Search
CPC .............................. G06F 3/0482; G06F 3/0488
See application file for complete search history.

(56) References Cited

U.S. PATENT DOCUMENTS 4,823,283 A 4/1989 Diehm et al.
5,045,997 A 9/1991 Watanabe
(Continued)

FOREIGN PATENT DOCUMENTS

CA 2363978 5/2003
CN 1749936 3/2006
(Continued)

OTHER PUBLICATIONS

"Non-Final Office Action", U.S. Appl. No. 12/433,605, Nov. 6, 2013, 16 pages.
(Continued)

*Primary Examiner* — Amare Mengistu
*Assistant Examiner* — Shawna Stepp Jones
(74) *Attorney, Agent, or Firm* — Jim Banowsky; Judy Yee; Micky Minhas

(57) ABSTRACT

Column organization of content is described. In an implementation, a mobile communications device configures a user interface to include a plurality of representations of content arranged according to a plurality of columns that permits navigation between first and second said columns upon detection of a gesture input via a touchscreen of the mobile communications device. The user interface is displayed on a display device of the mobile communications device. The first column is configured for vertical navigation through each of the plurality of representations and the second column includes a filtered subset of the plurality of representations such that at least one of the representations is included in the first column and not the second column.

20 Claims, 8 Drawing Sheets

(52) U.S. Cl.
CPC ..... *G06F3/04886* (2013.01); *H04M 1/274525* (2013.01); *G06F 2203/04807* (2013.01); *H04M 1/274583* (2013.01)

(56) References Cited

U.S. PATENT DOCUMENTS

| | | | |
|---|---|---|---|
| 5,046,001 A | 9/1991 | Barker et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,404,442 A | 4/1995 | Foster et al. | |
| 5,463,725 A | 10/1995 | Henckel et al. | |
| 5,485,197 A | 1/1996 | Hoarty | |
| 5,495,566 A | 2/1996 | Kwatinetz | |
| 5,515,495 A | 5/1996 | Ikemoto | |
| 5,574,836 A | 11/1996 | Broemmelsiek | |
| 5,598,523 A | 1/1997 | Fujita | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,675,329 A | 10/1997 | Barker | |
| 5,687,331 A | 11/1997 | Volk et al. | |
| 5,712,995 A | 1/1998 | Cohn | |
| 5,754,178 A | 5/1998 | Johnston, Jr. et al. | |
| 5,771,042 A | 6/1998 | Santos-Gomez | |
| 5,793,415 A | 8/1998 | Gregory et al. | |
| 5,819,284 A | 10/1998 | Farber et al. | |
| 5,860,073 A | 1/1999 | Ferrel et al. | |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 6,008,809 A | 12/1999 | Brooks | |
| 6,008,816 A | 12/1999 | Eisler | |
| 6,009,519 A | 12/1999 | Jones et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,184,879 B1 | 2/2001 | Minemura et al. | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,266,098 B1 | 7/2001 | Cove et al. | |
| 6,278,448 B1 | 8/2001 | Brown et al. | |
| 6,311,058 B1 | 10/2001 | Wecker et al. | |
| 6,317,142 B1 | 11/2001 | Decoste et al. | |
| 6,369,837 B1 | 4/2002 | Schirmer | |
| 6,385,630 B1 | 5/2002 | Ejerhed | |
| 6,396,963 B2 | 5/2002 | Shaffer | |
| 6,411,307 B1 | 6/2002 | Rosin et al. | |
| 6,424,338 B1 | 7/2002 | Anderson | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,582 B1 | 5/2003 | Sciammarella et al. | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 | 9/2003 | Dodson et al. | |
| 6,642,944 B2 | 11/2003 | Conrad et al. | |
| 6,662,023 B1 | 12/2003 | Helle | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,784,925 B1 | 8/2004 | Tomat et al. | |
| 6,798,421 B2 | 9/2004 | Baldwin | |
| 6,801,203 B1 | 10/2004 | Hussain | |
| 6,832,355 B1 | 12/2004 | Duperrouzel et al. | |
| 6,857,104 B1 | 2/2005 | Cahn | |
| 6,865,297 B2 | 3/2005 | Loui | |
| 6,873,329 B2 | 3/2005 | Cohen et al. | |
| 6,876,312 B2 | 4/2005 | Yu | |
| 6,885,974 B2 | 4/2005 | Holle | |
| 6,904,597 B2 | 6/2005 | Jin | |
| 6,938,101 B2 | 8/2005 | Hayes et al. | |
| 6,961,731 B2 | 11/2005 | Holbrook | |
| 6,972,776 B2 | 12/2005 | Davis et al. | |
| 6,975,306 B2 | 12/2005 | Hinckley | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,007,238 B2 | 2/2006 | Glaser | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,197,702 B2 | 3/2007 | Niyogi et al. | |
| 7,210,099 B2 | 4/2007 | Rohrabaugh et al. | |
| 7,213,079 B2 | 5/2007 | Narin | |
| 7,216,588 B2 | 5/2007 | Suess | |
| 7,249,326 B2 | 7/2007 | Stoakley et al. | |
| 7,262,775 B2 | 8/2007 | Calkins et al. | |
| 7,280,097 B2 | 10/2007 | Chen | |
| 7,283,620 B2 | 10/2007 | Adamczyk | |
| 7,289,806 B2 | 10/2007 | Morris et al. | |
| 7,296,184 B2 | 11/2007 | Derks et al. | |
| 7,296,242 B2 | 11/2007 | Agata et al. | |
| 7,310,100 B2 | 12/2007 | Hussain | |
| 7,333,092 B2 | 2/2008 | Zadesky et al. | |
| 7,333,120 B2 | 2/2008 | Venolia | |
| 7,336,263 B2 | 2/2008 | Valikangas | |
| 7,369,647 B2 | 5/2008 | Gao et al. | |
| 7,376,907 B2 | 5/2008 | Santoro et al. | |
| 7,386,807 B2 | 6/2008 | Cummins et al. | |
| 7,388,578 B2 | 6/2008 | Tao | |
| 7,403,191 B2 | 7/2008 | Sinclair | |
| 7,408,538 B2 | 8/2008 | Hinckley et al. | |

(56) References Cited

U.S. PATENT DOCUMENTS

| | | | |
|---|---|---|---|
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,782,332 B2 | 8/2010 | Nagata |
| 7,782,339 B1 | 8/2010 | Hobbs et al. |
| 7,792,876 B2 | 9/2010 | Easwar |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,933,632 B2 | 4/2011 | Flynt et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,074,174 B2 | 12/2011 | Suzuki et al. |
| 8,086,275 B2 | 12/2011 | Wykes |
| 8,108,781 B2 | 1/2012 | Laansoo et al. |
| 8,127,254 B2 | 2/2012 | Lindberg et al. |
| 8,130,226 B2 | 3/2012 | Brunner et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,200,779 B2 | 6/2012 | Wei et al. |
| 8,225,193 B1 | 7/2012 | Kleinschnitz et al. |
| 8,238,526 B1 | 8/2012 | Seth et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,266,550 B1 | 9/2012 | Cleron et al. |
| 8,269,736 B2 | 9/2012 | Wilairat |
| 8,280,901 B2 | 10/2012 | McDonald |
| 8,289,688 B2 | 10/2012 | Behar et al. |
| 8,294,715 B2 | 10/2012 | Patel et al. |
| 8,299,943 B2 | 10/2012 | Longe |
| 8,355,698 B2 | 1/2013 | Teng et al. |
| 8,385,952 B2 | 2/2013 | Friedman et al. |
| 8,411,046 B2 * | 4/2013 | Kruzeniski et al. ........... 345/173 |
| 8,448,083 B1 | 5/2013 | Migos et al. |
| 8,548,431 B2 | 10/2013 | Teng et al. |
| 8,564,461 B2 | 10/2013 | Rubanovich et al. |
| 8,634,876 B2 | 1/2014 | Friedman |
| 8,781,533 B2 | 7/2014 | Wykes et al. |
| 8,892,170 B2 | 11/2014 | Teng et al. |
| 8,914,072 B2 | 12/2014 | Smuga et al. |
| 8,970,499 B2 | 3/2015 | Wykes et al. |
| 2001/0015721 A1 | 8/2001 | Byun et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026349 A1 | 2/2002 | Reilly et al. |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic et al. |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0137884 A1 | 7/2004 | Engstrom et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis et al. |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko et al. |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0143138 A1 | 6/2005 | Lee et al. |
| 2005/0179654 A1 | 8/2005 | Hawkins |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja et al. |
| 2005/0280719 A1 | 12/2005 | Kim et al. |
| 2006/0004685 A1 | 1/2006 | Pyhalammi et al. |
| 2006/0005207 A1 | 1/2006 | Louch et al. |

(56) References Cited

U.S. PATENT DOCUMENTS

| | | |
|---|---|---|
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0025220 A1 | 2/2006 | Macauley et al. |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0070005 A1 | 3/2006 | Gilbert et al. |
| 2006/0070007 A1 | 3/2006 | Cummins et al. |
| 2006/0074735 A1 | 4/2006 | Shukla et al. |
| 2006/0074771 A1 | 4/2006 | Kim |
| 2006/0103623 A1 | 5/2006 | Davis |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0206590 A1 | 9/2006 | Wakasa et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050337 A1 | 3/2007 | Venkataraman et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0073718 A1 | 3/2007 | Ramer |
| 2007/0076013 A1 | 4/2007 | Campbell |
| 2007/0079249 A1 | 4/2007 | Pall et al. |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0118801 A1 | 5/2007 | Harshbarger et al. |
| 2007/0120835 A1 | 5/2007 | Sato |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192708 A1 | 8/2007 | Lee et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0232342 A1 | 10/2007 | Larocca |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0255831 A1 | 11/2007 | Hayashi |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0009272 A1 | 1/2008 | Toledano |
| 2008/0022560 A1 | 1/2008 | Grimmeisen |
| 2008/0028294 A1 | 1/2008 | Sell et al. |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0068447 A1 | 3/2008 | Mattila et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0094370 A1 | 4/2008 | Ording et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168349 A1 | 7/2008 | Lamiraux et al. |
| 2008/0168379 A1 | 7/2008 | Forstall et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |

(56) References Cited

U.S. PATENT DOCUMENTS

| | | |
|---|---|---|
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi et al. |
| 2008/0215980 A1 | 9/2008 | Lee et al. |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0250035 A1 | 10/2008 | Smith et al. |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0295017 A1 | 11/2008 | Tseng |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0002332 A1 | 1/2009 | Park et al. |
| 2009/0007009 A1 | 1/2009 | Luneau |
| 2009/0007017 A1 | 1/2009 | Anzures et al. |
| 2009/0012952 A1 | 1/2009 | Fredriksson |
| 2009/0019369 A1 | 1/2009 | Borovsky et al. |
| 2009/0029736 A1 | 1/2009 | Kim et al. |
| 2009/0031247 A1 | 1/2009 | Walter et al. |
| 2009/0037413 A1 | 2/2009 | Castell et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0070695 A1 | 3/2009 | Oh et al. |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109184 A1 | 4/2009 | Kim et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0119606 A1 | 5/2009 | Gilbert |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0170480 A1 | 7/2009 | Lee |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0249257 A1 | 10/2009 | Bove et al. |
| 2009/0259971 A1 | 10/2009 | Rankine et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288032 A1 | 11/2009 | Chang et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0328101 A1 | 12/2009 | Suomela et al. |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0023871 A1 | 1/2010 | Bederson et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0066698 A1 | 3/2010 | Seo |
| 2010/0070931 A1 | 3/2010 | Nichols |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088634 A1 | 4/2010 | Tsuruta et al. |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng et al. |
| 2010/0248741 A1 | 9/2010 | Setlur et al. |
| 2010/0248787 A1 | 9/2010 | Smuga |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |

(56) References Cited

U.S. PATENT DOCUMENTS

| | | |
|---|---|---|
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302712 A1 | 12/2010 | Zednicek et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0154235 A1 | 6/2011 | Min et al. |
| 2011/0161845 A1 | 6/2011 | Stallings et al. |
| 2011/0163968 A1 | 7/2011 | Hogan |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0225547 A1 | 9/2011 | Fong et al. |
| 2011/0231796 A1 | 9/2011 | Vigil |
| 2011/0252380 A1 | 10/2011 | Chaudhri |
| 2012/0028687 A1 | 2/2012 | Wykes |
| 2012/0050185 A1 | 3/2012 | Davydov et al. |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0179992 A1 | 7/2012 | Smuga |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0244841 A1 | 9/2012 | Teng |
| 2012/0254780 A1 | 10/2012 | Mouton |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0311485 A1 | 12/2012 | Caliendo, Jr. et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047105 A1 | 2/2013 | Jarrett |
| 2013/0047117 A1 | 2/2013 | Deutsch |
| 2013/0057587 A1 | 3/2013 | Leonard et al. |
| 2013/0057588 A1 | 3/2013 | Leonard |
| 2013/0102366 A1 | 4/2013 | Teng |
| 2014/0068446 A1 | 3/2014 | Friedman |
| 2014/0094226 A1 | 4/2014 | Friedman |
| 2014/0320415 A1 | 10/2014 | Wykes et al. |
| 2015/0040057 A1 | 2/2015 | Smuga et al. |
| 2015/0169079 A1 | 6/2015 | Wykes et al. |

FOREIGN PATENT DOCUMENTS

| | | |
|---|---|---|
| CN | 1936797 | 3/2007 |
| CN | 101047656 | 10/2007 |
| CN | 101127736 | 2/2008 |
| CN | 101228570 | 7/2008 |
| CN | 101296457 | 10/2008 |
| CN | 101308440 | 11/2008 |
| CN | 101331891 | 11/2008 |
| CN | 102197702 | 9/2011 |
| EP | 0583060 | 2/1994 |
| EP | 1469375 | 10/2004 |
| EP | 1752868 | 2/2007 |
| EP | 1959338 | 8/2008 |
| JP | H03246614 | 11/1991 |
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008204210 | 9/2008 |
| JP | 2008217808 | 9/2008 |
| JP | 2008536196 | 9/2008 |
| JP | 2008257442 | 10/2008 |
| JP | 2009015457 | 1/2009 |
| JP | 2009522666 | 6/2009 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |
| RU | 2254611 | 1/2005 |
| RU | 2308076 | 10/2007 |
| RU | 2345425 | 1/2009 |
| RU | 2347261 | 2/2009 |
| TW | 200404444 | 3/2004 |
| TW | 200828096 | 7/2008 |
| TW | 201023026 | 6/2010 |
| WO | WO-9926127 | 5/1999 |
| WO | WO-03062976 | 7/2003 |
| WO | WO-2003091034 | 11/2003 |
| WO | WO-2004097680 | 11/2004 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007099424 | 9/2007 |
| WO | WO-2007121557 | 11/2007 |
| WO | WO-2007134623 | 11/2007 |
| WO | WO-2008030608 | 3/2008 |
| WO | WO-2008030976 | 3/2008 |

(56) References Cited

FOREIGN PATENT DOCUMENTS

| WO | WO-2008031871 | 3/2008 |
|----|---------------|--------|
| WO | WO-2008035831 | 3/2008 |
| WO | WO2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |
| WO | WO-2011041885 | 4/2011 |

OTHER PUBLICATIONS

"Non-Final Office Action", U.S. Appl. No. 12/244,545, Dec. 19, 2013, 22 pages.
"Final Office Action", U.S. Appl. No. 12/469,480, Dec. 5, 2013, 24 pages.
"Foreign Office Action", Mexican Application No. MX/a/2011/012279, Jul. 4, 2013, 3 Pages.
"Foreign Office Action", Japanese Application No. 2011-533353, Nov. 26, 2013, 4 pages.
"Foreign Office Action", JP Application No. 2012-503515, Nov. 18, 2013, 5 Pages.
"Foreign Office Action", Chinese Application No. 201080015728.1, Oct. 29, 2013, 8 Pages.
"Final Office Action", U.S. Appl. No. 13/418,884, Dec. 30, 2013, 8 pages.
"Foreign Notice of Allowance", AU Application No. 2010234909, 05/0202/14, 3 pages.
"Foreign Notice of Allowance", CN Application No. 201080015802.X, Sep. 10, 2014, 6 Pages.
"Foreign Notice of Allowance", JP Application No. 2012-516218, Nov. 4, 2014, 4 Pages.
"Foreign Office Action", CN Application No. 200980139831.4, Oct. 10, 2014, 10 Pages.
"Intent to Grant", EP Application No. 10762112.0, Aug. 28, 2014, 5 Pages.
"Notice of Allowance", U.S. Appl. No. 14/330,221, Oct. 16, 2014, 7 pages.
"Corrected Notice of Allowance", U.S. Appl. No. 14/330,221, Feb. 2, 2015, 2 pages.
"Foreign Office Action", RU Application No. 2011151097, Dec. 9, 2014, 7 pages.
"Adobe Acrobat 8 Standard User Guide", Adobe Systems Incorporated,(2007), pp. 34 & 36.
"Advisory Action", U.S. Appl. No. 12/414,382, (Jan. 20, 2012), 3 pages.
"Advisory Action", U.S. Appl. No. 12/433,605, (Apr. 5, 2012), 3 pages.
"Alltel Adds Dedicated Search Key to Phones", Retrieved from: <http://www.phonescoop.com/news/item.php?n=2159> on Nov. 26, 2008., (Apr. 12, 2007), 2 Pages.
"Android 2.3 Users Guide", AUG-2.3-103, Android mobile technology platform 2.3,(Dec. 13, 2010), 380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.
"Application User Model IDs", Retrieved from: <http://msdn.microsoft.com/en-us/library/dd378459(VS.85).aspx> on Sep. 28, 2010, (2010), 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.
"Basics of Your Device: Get Familiar with the Home Screen", *Nokia USA—How to*, retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Calc4M", Retrieved from: <http://www.hellebo.com/Calc4M.html> on Dec. 11, 2008, (Sep. 10, 2008), 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009), 5 Pages.
"Dial a number", Retrieved from: <http://www.phonespell.org/ialhelp.html> on Nov. 20, 2008, 1 page.
"DuoSense™ Multi-Touch Gestures", Retrieved from: <http://www.n-trig.com/Data/Uploads/Misc/DuoSenseMTG_final.pdf>, (Jul. 2008), 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., 2 pages.
"Email Notification for Microsoft Outlook and Outlook Express", Retrieved from: <http://www.contextmagic.com/express-notification/> on Sep. 29, 2010, (Jul. 21, 2004), 3 pages.
"Enhanced IBM Power Systems Software and PowerVM Restructuring", *IBM United States Announcement 208-082*, dated Apr. 8, 2008, available at <http://www.ibm.com/common/ssi/rep_ca/2/897/ENUS208-082/ENUS208082.PDF>,(Apr. 8, 2008), pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),14 pages.
"Extended European Search Report", European Patent Application No. 09818253.8, (Apr. 10, 2012), 7 pages.
"Extended European Search Report", European Patent Application No. 09822736.6, (Dec. 18, 2012), 7 pages.
"eXtreme Energy Conservation: Advanced Power-Saving Software for Wireless Devices", *White Paper, Freescale Semiconductor, Inc.*, Document No. XTMENRGYCNSVWP, Rev #0, available at <http://www.freescale.com/files/32bit/doc/white_paper/XTMENRGYCNSVWP.pdf>,(Feb. 2006), 15 pages.
"Final Office Action", U.S. Appl. No. 11/305,789, (Apr. 1, 2009), 10 pages.
"Final Office Action", U.S. Appl. No. 11/502,264, (Feb. 4, 2010), 15 pages.
"Final Office Action", U.S. Appl. No. 11/502,264, (Apr. 3, 2009), 9 pages.
"Final Office Action", U.S. Appl. No. 12/244,545, (Dec. 7, 2011), 16 pages.
"Final Office Action", U.S. Appl. No. 12/244,545, (Sep. 7, 2012), 23 pages.
"Final Office Action", U.S. Appl. No. 12/413,977, (Nov. 17, 2011), 16 pages.
"Final Office Action", U.S. Appl. No. 12/414,382, (Dec. 23, 2011), 7 pages.
"Final Office Action", U.S. Appl. No. 12/414,476, (Apr. 8, 2013), 25 pages.
"Final Office Action", U.S. Appl. No. 12/414,476, (Dec. 1, 2011), 20 pages.
"Final Office Action", U.S. Appl. No. 12/433,605, (Feb. 3, 2012), 11 pages.
"Final Office Action", U.S. Appl. No. 12/433,667, (Jan. 7, 2013), 17 pages.
"Final Office Action", U.S. Appl. No. 12/433,667, (Sep. 13, 2011), 17 pages.
"Final Office Action", U.S. Appl. No. 12/469,458, (Feb. 1, 2013), 19 pages.
"Final Office Action", U.S. Appl. No. 12/469,458, (Nov. 17, 2011), 15 pages.
"Final Office Action", U.S. Appl. No. 12/469,480, (Apr. 10, 2013), 21 pages.
"Final Office Action", U.S. Appl. No. 12/469,480, (Feb. 9, 2012), 17 pages.

(56) References Cited

OTHER PUBLICATIONS

"Final Office Action", U.S. Appl. No. 12/480,969, (Nov. 23, 2012), 18 pages.
"Final Office Action", U.S. Appl. No. 12/484,799, (Apr. 30, 2012), 13 pages.
"Final Office Action", U.S. Appl. No. 12/560,081, (Mar. 14, 2012), 16 pages.
"Foreign Office Action", Chinese Application No. 200980142632.9, (Jan. 29, 2013), 11 pages.
"Foreign Office Action", Chinese Application No. 200980142644.1, (Apr. 3, 2013), 10 pages.
"Foreign Office Action", Chinese Application No. 200980142661.5, (Jan. 21, 2013), 12 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Freeware.mobi", Retrieved from: <http://www.palmfreeware.mobi/download-palette.html> on Nov. 6, 2008, (Oct. 9, 2001), 2 pages.
"GnomeCanvas", Retrieved from: <http://library.gnome.org/devel/libgnomecanyas/unstable/GnomeCanyas.html>on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010), 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, (Sep. 16, 2009), 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.
"HTC Shows HTC Snap with Snappy Email Feature", Retrieved from: <http://www.wirelessandmobilenews.com/smartphones/ on May 5, 2009>, (May 4, 2009), 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.
"International Search Report and Written Opinion", International Application No. PCT/US2011/055521, (May 15, 2012), 9 pages.
"International Search Report and Written Opinion", International Application No. PCT/US2011/055522, (May 15, 2012), 9 pages.
"International Search Report and Written Opinion", International Application No. PCT/US2011/055514, (May 22, 2012), 8 pages.
"International Search Report", Application No. PCT/US2010/028553, Application Filing Date: Mar. 24, 2010,(Nov. 9, 2010), 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", *Infragistics Software Manual*, Version 7.3.20073.1043, (Nov. 2007), 95 pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc.,(2009), 153 pages.
"Keyboard (5)", Retrieved from: <http://landru.uwaterloo.ca/cgi-bin/man.cgi?section=5&topic=keyboard> on Dec. 11, 2008., (Aug. 11, 1997), 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.
"Kiosk Browser Chrome Customization Firefox 2.X", Retrieved from: <http://stlouis-shopper.com/cgi-bin/mozdev-wiki/.pl?ChromeCustomization> on Oct. 22, 2008 Making a new chrome for the kiosk browser, Kiosk Project Kiosk Browser Chrome Customization Firefox-2.x,(Aug. 16, 2007), 2 pages.
"Live Photo Gallery—Getting Started—from Camera to Panorama", Retirved from: <http://webdotwiz.spaces.live.com/blog/cns!2782760752B93233!1729.entry> on May 5, 2009., (Sep. 2008), 7 Pages.
"Magic mouse", Retrieved from: <http://www.apple.com/magicmouse/> on May 10, 2011, 3 pages.
"MIDTB Tip Sheet: Book Courier", Retrieved from: <http://www.midtb.org/tipsbookcourier.htm> on Dec. 11, 2008., (Sep. 26, 2005), 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, (2009), 30 pages.
"moGo beta v.0.4", Retrieved from: <http://forum.xda-developers.com/showthread.php?t=375196> on Sep. 27, 2010, (Mar. 7, 2008),10 pages.
"Multi-touch", Retrieved from <http://en.wikipedia.org/wiki/Multi-touch#Microsoft_Surface> on Apr. 24, 2009, (Apr. 17, 2009), 8 pages.
"My Favorite Gadgets, System Monitor II", Retrieved from <http://www.myfavoritegadgets.info/monitors/SystemMonitorII/system-monitorII.html> on Mar. 12, 2013, (Jun. 8, 2010), 5 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.
"Non-Final Office Action", U.S. Appl. No. 11/215,052, (Jun. 23, 2011),17 pages.
"Non-Final Office Action", U.S. Appl. No. 11/305,789, (Sep. 21, 2009),5 pages.
"Non-Final Office Action", U.S. Appl. No. 11/502,264, (Sep. 30, 2009),15 pages.
"Non-Final Office Action", U.S. Appl. No. 11/502,264, (Sep. 14, 2012),14 pages.
"Non-Final Office Action", U.S. Appl. No. 12/244,545, (Mar. 27, 2012),18 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/413,977, (Jul. 20, 2012),18 pages.
"Non-Final Office Action", U.S. Appl. No. 12/414,382, (Jul. 26, 2011), 9 pages.
"Non-Final Office Action", U.S. Appl. No. 12/414,434, (Jan. 17, 2012), 7 pages.
"Non-Final Office Action", U.S. Appl. No. 12/414,434, (May 31, 2012), 7 pages.
"Non-Final Office Action", U.S. Appl. No. 12/414,434, (Aug. 2, 2011), 6 pages.
"Non-Final Office Action", U.S. Appl. No. 12/414,455, (Aug. 29, 2011), 8 pages.
"Non-Final Office Action", U.S. Appl. No. 12/414,458, (Jul. 6, 2011), 8 pages.
"Non-Final Office Action", U.S. Appl. No. 12/414,476, (Nov. 9, 2012), 22 pages.
"Non-Final Office Action", U.S. Appl. No. 12/414,476, (Aug. 3, 2011), 21 pages.
"Non-Final Office Action", U.S. Appl. No. 12/433,605, (Jan. 11, 2013),7 pages.
"Non-Final Office Action", U.S. Appl. No. 12/433,605, (Jun. 24, 2011),10 pages.
"Non-Final Office Action", U.S. Appl. No. 12/433,667, (Jun. 7, 2011),15 pages.

(56) References Cited

OTHER PUBLICATIONS

"Non-Final Office Action", U.S. Appl. No. 12/433,667, (Feb. 3, 2012),16 pages.
"Non-Final Office Action", U.S. Appl. No. 12/469,419, (Nov. 9, 2011),15 pages.
"Non-Final Office Action", U.S. Appl. No. 12/469,419, (May 23, 2012),13 pages.
"Non-Final Office Action", U.S. Appl. No. 12/469,458, (Jul. 1, 2011),15 pages.
"Non-Final Office Action", U.S. Appl. No. 12/469,458, (Sep. 21, 2012),14 pages.
"Non-Final Office Action", U.S. Appl. No. 12/469,480, (Oct. 17, 2012),16 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011), 9 pages.
"Non-Final Office Action", U.S. Appl. No. 12/480,969, (Apr. 4, 2013), 22 pages.
"Non-Final Office Action", U.S. Appl. No. 12/480,969, (Aug. 7, 2012),15 pages.
"Non-Final Office Action", U.S. Appl. No. 12/484,799, (Aug. 11, 2011),12 pages.
"Non-Final Office Action", U.S. Appl. No. 12/484,799, (Aug. 7, 2012),13 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Non-Final Office Action", U.S. Appl. No. 12/972,967, (Jan. 30, 2013),19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 12/983,106, (Nov. 9, 2012),17 pages.
"Non-Final Office Action", U.S. Appl. No. 13/118,204, (Feb. 28, 2013),13 pages.
"Non-Final Office Action", U.S. Appl. No. 13/118,257, (Mar. 5, 2013),19 pages.
"Non-Final Office Action", U.S. Appl. No. 13/118,339, (Feb. 11, 2013),15 pages.
"Non-Final Office Action", U.S. Appl. No. 13/118,347, (Feb. 12, 2013),14 pages.
"Non-Final Office Action", U.S. Appl. No. 13/196,272, (Feb. 6, 2013),10 pages.
"Non-Final Office Action", U.S. Appl. No. 13/224,258, (Jan. 8, 2013), 35 pages.
"Non-Final Office Action", U.S. Appl. No. 13/229,693, (Mar. 12, 2013), 21 pages.
"Non-Final Office Action", U.S. Appl. No. 13/492,495, (Dec. 19, 2012), 6 pages.
"Non-Final Office Action", U.S. Appl. No. 13/492,495, (Sep. 17, 2012), 8 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013),10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013),19 pages.
"Non-Final Office Action", U.S. Appl. No. 13/657,646, (Jan. 3, 2013),13 pages.
"Non-Final Office Action", U.S. Appl. No. 13/657,789, (Jan. 9, 2013), 38 pages.
"Notice of Allowance", U.S. Appl. No. 11/215,052, (Mar. 14, 2012), 5 pages.
"Notice of Allowance", U.S. Appl. No. 11/305,789, (Nov. 23, 2009), 8 pages.
"Notice of Allowance", U.S. Appl. No. 12/414,382, (Apr. 4, 2012), 4 pages.
"Notice of Allowance", U.S. Appl. No. 12/414,434, (Aug. 17, 2012), 4 pages.
"Notice of Allowance", U.S. Appl. No. 12/414,455, (Jan. 4, 2012), 4 pages.
"Notice of Allowance", U.S. Appl. No. 12/414,458, (Oct. 31, 2011), 2 pages.
"Notice of Allowance", U.S. Appl. No. 12/414,458, (Nov. 29, 2011), 2 pages.
"Notice of Allowance", U.S. Appl. No. 12/414,458, (Aug. 10, 2011), 6 pages.
"Notice of Allowance", U.S. Appl. No. 12/469,419, (Nov. 27, 2012),13 pages.
"Notice of Allowance", U.S. Appl. No. 12/470,558, (Apr. 2, 2012), 7 pages.
"Notice of Allowance", U.S. Appl. No. 12/470,558, (Aug. 23, 2012), 2 pages.
"Notice of Allowance", U.S. Appl. No. 12/484,799, (Oct. 22, 2012),10 pages.
"Notice of Allowance", U.S. Appl. No. 12/484,845, (Mar. 16, 2012), 5 pages.
"Notifications", retrieved from <http://msdn.microsoft.com/en-us/library/aa511497.aspx> on May 10, 2011,16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.
"Oracle8i Application Developers Guide—Advanced Queuing", Retrieved from: http://www.cs.umbc.edu/help/oracle8/server.815/a68005/03_adq1i.htm on May 6, 2009., (Feb. 1999), 29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com/symbian> on Nov. 6, 2008, (Jan. 21, 2003), 2 pages.
"Parallax Scrolling", Retrieved from: <http://en.wikipedia.org/wiki/Parallax_scrolling> on May 5, 2009., (May 4, 2009), 3 Pages.
"PCT Search Report and Written Opinion", Application No. PCT/US2009/061382, (May 26, 2010), 10 pages.
"PCT Search Report and Written Opinion", Application No. PCT/US2009/061735, (Jun. 7, 2010), 11 pages.
"PCT Search Report and Written Opinion", Application No. PCT/US2010/028699, (Oct. 4, 2010), 10 pages.
"PCT Search Report and Written Opinion", Application No. PCT/US2010/028555, (Oct. 12, 2010), 10 pages.
"PCT Search Report and Written Opinion", Application No. PCT/US2010/034772, (Dec. 29, 2010), 12 pages.
"PCT Search Report and Written Opinion", Application No. PCT/US2011/055511, (Apr. 24, 2012), 9 pages.
"PCT Search Report and Written Opinion", Application No. PCT/US2011/055520, (May 9, 2012), 8 pages.
"PCT Search Report and Written Opinion", Application No. PCT/US2011/055523, (May 10, 2012), 9 pages.
"PCT Search Report and Written Opinion", Application No. PCT/US2011/055513, (Mar. 27, 2012), 8 pages.
"PCT Search Report and Written Opinion", Application No. PCT/US2011/055512, (May 24, 2012), 8 pages.
"PCT Search Report and Written Opinion", Application No. PCT/US2011/055524, (Jun. 1, 2012), 8 pages.
"PCT Search Report and Written Opinion", Application No. PCT/US2011/065702, (Aug. 29, 2012), 8 pages.
"PCT Search Report and Written Opinion", Application No. PCT/US2011/055712, (Sep. 21, 2012), 9 pages.

(56) References Cited

OTHER PUBLICATIONS

"PCT Search Report and Written Opinion", Application No. PCT/US2011/055736, (Sep. 17, 2012), 8 pages.
"PCT Search Report and Written Opinion", Application No. PCT/US2011/055496, (Sep. 12, 2012), 9 pages.
"PCT Search Report and Written Opinion", Application No. PCT/US2011/067073, (Sep. 17, 2012), 8 pages.
"PCT Search Report and Written Opinion", Application No. PCT/US2011/055746, (Sep. 27, 2012), 9 pages.
"PCT Search Report and Written Opinion", Application No. PCT/US2011/055725, (Sep. 27, 2012), 10 pages.
"PCT Search Report and Written Opinion", Application No. PCT/US2011/055478, (Sep. 27, 2012), 9 pages.
"PCT Search Report and Written Opinion", Application No. PCT/US2011/055493, (9/26/212), 9 pages.
"PCT Search Report and Written Opinion", Application No. PCT/US2011/067075, (Dec. 12, 2012), 10 pages.
"PCT Search Report and Written Opinion", PCT Application No. PCT/US2010/038730, (Jan. 19, 2011), 8 pages.
"PCT Search Report", Application Serial No. PCT/US2009/061864, (May 14, 2010), 10 pages.
"Push Notifications Overview for Windows Phone", Retrieved from: <http://msdn.microsoft.com/en-us/library/ff402558%28VS.92%29.aspx> on Sep. 30, 2010, (Sep. 3, 2010), 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, (Dec. 15, 2008), 3 pages.
"Snap", *Windows 7 Features*, retrieved from <http://windows.microsoft.com/en-US/windows7/products/features/snap> on Sep. 23, 2011, 2 pages.
"Symbian Applications", Retrieved from: <http://symbianfullversion.blogspot.com/2008_12_01_archive.html> on May 5, 2009., (Jan. 2009), 51 Pages.
"The Map Screen", retrieved from <http://www.symbianos.org/whereamiusersguide> on Jun. 17, 2011, 3 pages.
"Top 3 Task Switchers for Android", *TechCredo*, retrieved from <http://www.techcredo.com/android/top-3-task-switchers-for-android> on May 11, 2011,(Mar. 9, 2011), 5 pages.
"Top Android App: Swipepad", *Best Android Apps Review*, retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., (Feb. 23, 2009), 2 Pages.
"User Guide", retrieved from <http://wireframesketcher.com/help/help.html> on Jun. 17, 2011,19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011), 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010), 3 pages.
"Winterface Review", Retrieved from: <http://www.mytodayscreen.com/winterface-review/> on Nov. 12, 2008, (Jul. 9, 2008), 42 pages.
"Womma", Retrieved from: <http://www.womma.org/blog/links/wom-trends/> on May 5, 2009., (2007), 70 Pages.
"Working with Multiple Windows", *MSOFFICE tutorial!*, retrieved from <http://www.msoffice-tutorial.com/working-with-multiple-windows.php> on Sep. 23, 2011, 3 pages.
"YUI 3: ScrollView [beta]", Retrieved from: <http://developer.yahoo.com/yui/3/scrollview/> on Sep. 28, 2010, 5 pages.

Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996), 8 pages.
Beiber, Gerald et al., "Screen Coverage: A Pen-Interaction Problem for PDA's and Touch Screen Computers", In Proceedings of ICWMC 2007,(Mar. 2007), 6 pages.
Bjork, Staffan et al., "Redefining the Focus and and Context of Focus+Context Visualizations", *In Proceedings of INFOVIS 2000*, Available at <http://www.johan.redstrom.se/papers/redefining.pdf>, (Oct. 2000), 9 pages.
Bowes, James et al., "Transparency for Item Highlighting", *Faculty of Computing Science, Dalhousie University*, Available at <http://torch.cs.dal.ca/~dearman/pubs/GI2003-bowes,dearman,perkins-paper.pdf>,(2003), 2 pages.
Bruzzese, J. P., "Using Windows 7, Managing and Monitoring Windows 7—Chapter 11", *Que Publishing*, (May 5, 2010), 33 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx.ist.psu.edu/viewdoc/download?doi=10.1.1.134.4568&rep=rep1&type=pdf.>,(Sep. 2006), pp. 829-836.
Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002), 15 pages.
Cawley, Christian "How to Customise Your Windows Phone 7", Retrieved from:.<http://www.brighthub.com/mobile/windows-mobile-platform/articles/95213.aspx> on May 10, 2011,(Nov. 12, 2010), 3 pages.
Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011), 2 pages.
Cohen, Michael F., et al., "Wang Tiles for Image and Texture Generation", In Proceedings of SIGGRAPH 2003, Available <http://research.microsoft.com/en-us/um/people/cohen/WangFinal.pdf>,(2003), 8 pages.
Crouch, Dennis "Smartphone Wars: Micron's Slide-to-Unlock Patent", (Jan. 30, 2013), 2 pages.
Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011), 5 pages.
Davis, Ashley "A WPF Custom Control for Zooming and Panning", Retrieved from: <http://www.codeproject.com/KB/WPF/zoomandpancontrol.aspx> on Sep. 28, 2010, (Jun. 29, 2010), 21 pages.
Delimarsky, Den "Sending Tile Push Notifications on Windows Phone 7", retrieved from <http://mobile.dzone.com/articles/sending-tile-push> on May 10, 2011,(Aug. 25, 2010), 2 pages.
Denoue, Laurent et al., "WebNC: Efficient Sharing of Web Applications", *In Proceedings of WWW 2009*, Available at <http://www.fxpal.com/publications/FXPAL-PR-09-495.pdf>,(2009), 2 pages.
Dolcourt, Jessica "Webware", Retrieved from: <http://news.cnet.com/webware/?categayId=2010> on May 5, 2009., 13 Pages.
Dunsmuir, Dustin "Selective Semantic Zoom of a Document Collection", Available at <http://www.cs.ubc.ca/~tmm/courses/533/projects/dustin/proposal.pdf>,(Oct. 30, 2009), pp. 1-9.
Fisher, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010), 3 pages.
Gade, Lisa "Samsung Alias u740", Retrieved from: <http://www.mobiletechreview.com/phones/Samsung-U740.htm> on Nov. 20, 2008, (Mar. 14, 2007), 6 pages.
Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.
Gralla, Preston "Windows XP Hacks, Chapter 13—Hardware Hacks", *O'Reilly Publishing*, (Feb. 23, 2005), 25 pages.

(56) References Cited

OTHER PUBLICATIONS

Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.
Harrison, Richard "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,(Jun. 16, 2003), 4 pages.
Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.
Horowitz, Michael "Installing and Tweaking Process Explorer part 2", Retrieved from <http://web.archive.org/web/20110510093838/http://blogs.computerworld.com/16165/installing_and_tweaking_process_explorer_part 2> on Mar. 12, 2013, (May 23, 2010), 7 pages.
Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf> ,(Feb. 15, 2005), pp. 1-15.
Kcholi, Avi "Windows CE.NET Interprocess Communication", Retrieved from http://msdn.microsoft.com/en-us/library/ms836784.aspx on Jul. 17, 2008., (Jan. 2004), 15 Pages.
La, Nick "Parallax Gallery", Available at <http://webdesignerwall.comtutorials/parallax-gallery/comment-page-1>,(Apr. 25, 2008),16 pages.
Livingston, et al., "Windows 95 Secrets", 1995, *IDG Books Worldwide, 3rd Edition*, (1995), pp. 121-127.
Long, Todd "Gmail Manager 0.6", Retrieved from: <https://addons.mozilla.org/en-US/firefox/addon/1320/> on Sep. 29, 2010, (Jan. 27, 2010), 4 pages.
Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>,(Sep. 2005), pp. 1717-1731.
Mantia, Louie "Multitasking: What Does It Mean?", retrieved from <http://mantia.me/blog/multitasking/> on Sep. 23, 2011, 3 pages.
Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000), 5 Pages.
Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to-switch-applications/> on May 11, 2011,(Nov. 13, 2010), 4 pages.
Mei, Tao et al., "Probabilistic Multimodality Fusion for Event Based Home Photo Clustering", Retrieved from: <http://ieeexplore.ieee.org//stamp/stamp.jsp?tp&arnumber=04036960.>, (Dec. 26, 2006), pp. 1757-1760.
Nordgren, Peder "Development of a Touch Screen Interface for Scania Interactor", *Masters Thesis in Computing Science, UMEA University*, Available at <http://www.cs.umu.se/education/examina/Rapporter/PederNordgren.pdf>,(Apr. 10, 2007), pp. 1-59.
Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, AppleInsider,(Sep. 18, 2008), 4 pages.
Oryl, Michael "Review: Asus P527 Smartphone for North America", Retrieved from: <http://www.mobileburn.com/review.jsp?Id=4257> on Dec. 17, 2008., (Mar. 5, 2008),1 Page.
Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.

Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010), 3 pages.
Perry, Greg "Teach Yourself Windows 95 in 24 Hours", 1997, *Sams Publishing, 2nd Edition*, (1997), pp. 193-198.
Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.
Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010), 2 pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008), 1 page.
Remond, Mickael "Mobile Marketing Solutions", Retrieved from: <http://www.mobilemarketingmagazine.co.uk/mobile_social_networking/> on May 5, 2009., (Apr. 28, 2009),16 Pages.
Rice, Stephen V., et al., "A System for Searching Sound Palettes", *Proceedings of the Eleventh Biennial Symposium on Arts and Technology.*, Available at <http://www.comparisonics.com/FindSoundsPalettePaper.pdf>,(Feb. 2008), 6 pages.
Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010), 2 pages.
Ritscher, Walt "Using Surface APIs in your WPF—Part 1", Retrieved from: <http://blog.wpfwonderland.com/2009/06/30/using-surface-apis-in-your-wpf-application/> on Sep. 28, 2010, (Jun. 30, 2009), 7 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.
Sandoval, Guillermo L., "A development platform and execution environment for mobile applications", *Universidad Autónoma de Baja California, School of Chemical Sciences and Engineering*, Available at <http://citeseerx.ist.psu.edu/viewdoc/download?doi=10.1.1.86.7989&rep=rep1&type=pdf>,(2004),18 pages.
Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002), 83 Pages.
Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003), pp. 1-10.
Steinicke, Frank et al., "Multi—Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008), 4 Pages.
Suror, "PocketShield—New Screenlock App for the HTC Diamond and Pro", Retrieved from: <http://wmpoweruser.com/?tag=htc-touch-diamond> on Jun. 28, 2011, (Oct. 23, 2008), 2 pages.
Terpstra, Brett "Beta Beat: Grape, a New Way to Manage Your Desktop Clutter", Retrieved from: *Beta Beat: Grape, a New Way to Manage Your Desktop Clutter* on Jun. 28, 2011 (Apr. 14, 2009), 4 pages.
Vallerio, Keith S., et al., "Energy-Efficient Graphical User Interface Design", Retrieved from: <http://www.cc.gatech.edu/classes/AY2007/cs7470_fall/zhonq-energy-efficient-user-interface.pdf>, (Jun. 10, 2004), pp. 1-13.
Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011), 4 pages.
Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011), 6 pages.

(56) References Cited

OTHER PUBLICATIONS

Vornberger, Jan "Bluetile", Retrieved from: <http://www.bluetile.org> on Sep. 29, 2010, 5 pages.
Wilson, Andrew D., "Robust Computer Vision-Based Detection of Pinching for One and Two-Handed Gesture Input", *In Proceedings of UIST 2006*, Available at <http://research.microsoft.com/en-us/um/people/awilson/publications/wilsonuist2006/uist%202006%20taffi.pdf>,(Oct. 2006), 4 pages.
Wilson, Tracy V., "How the iPhone Works", Retrieved from: <http://electronics.howstuffworks.com/iphone2.htm> on Apr. 24, 2009, (Jan. 2007), 9 pages.
Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009), 10 pages.
Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008), 25 pages.
Wyatt, Paul "/Flash/the art of parallax scrolling", .net Magazine,(Aug. 1, 2007), pp. 74-76.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.
"Final Office Action", U.S. Appl. No. 12/244,545, May 6, 2014, 24 pages.
"Final Office Action", U.S. Appl. No. 12/414,476, Apr. 24, 2014, 19 pages.
"Floating Layer", Retrieved from <http://web.archive.org/web/20011025040032/http://www.echoecho.com/toolfloatinglayer.htm> on Apr. 15, 2014, Oct. 25, 2001, 9 pages.
"Foreign Notice of Allowance", JP Application No. 2012-503523, Oct. 24, 2013, 4 pages.
"Foreign Office Action", AU Application No. 2010260165, Mar. 25, 2014, 3 Pages.
"Foreign Office Action", AU Application No. 2010260165, May 1, 2014, 3 Pages.
"Foreign Office Action", CN Application No. 200980139831.4, Mar. 24, 2014, 9 Pages.
"Foreign Office Action", JP Application No. 2012-516218, Mar. 6, 2014, 6 Pages.
"Non-Final Office Action", U.S. Appl. No. 12/560,081, Apr. 30, 2014, 25 pages.
"Notice of Allowance", U.S. Appl. No. 12/433,605, Apr. 25, 2014, 4 pages.
"Extended European Search Report", EP Application No. 10778152.8, Apr. 14, 2015, 7 pages.
"Final Office Action", U.S. Appl. No. 13/461,656, May 7, 2015, 24 pages.
"Foreign Notice of Allowance", RU Application No. 2011151097, Feb. 26, 2015, 16 pages.
"Foreign Office Action", CN Application No. 201080027409.2, Apr. 20, 2015, 14 Pages.
"Foreign Office Action", EP Application No. 10790080.5, May 18, 2015, 6 Pages.
"Foreign Office Action", IL Application No. 214804, Mar. 12, 2015, 6 Pages.
"Non-Final Office Action", U.S. Appl. No. 13/776,533, May 19, 2015, 52 pages.
"Supplementary European Search Report", EP Application No. 10790080.5, Apr. 21, 2015, 3 pages.
"Final Office Action", U.S. Appl. No. 12/433,605, (Jul. 17, 2013),13 pages.
"Foreign Office Action", Chinese Application No. 200980142632.9, (Jun. 14, 2013), 6 pages.
"Foreign Office Action", Chinese Application No. 201080015728.1, (May 16, 2013), 10 pages.
"Foreign Office Action", Chinese Application No. 201080015788.3, (Jun. 5, 2013), 12 pages.
"Foreign Office Action", Chinese Application No. 201080023212.1, (Jun. 5, 2013), 8 pages.
"Non-Final Office Action", U.S. Appl. No. 12/469,458, (May 3, 2013), 21 pages.
"Notice of Allowance", U.S. Appl. No. 12/433,667, (Jun. 25, 2013),14 pages.
"Notice of Allowance", U.S. Appl. No. 13/492,495, (Apr. 26, 2013), 5 pages.
"Corrected Notice of Allowance", U.S. Appl. No. 13/270,111, Jun. 17, 2014, 2 pages.
"Corrected Notice of Allowance", U.S. Appl. No. 13/270,111, Jun. 23, 2014, 3 pages.
"Foreign Office Action", CN Application No. 201080015802.X, May 19, 2014, 7 Pages.
"Foreign Office Action", JP Application No. 2011-530109, May 2, 2014, 4 Pages.
"Non-Final Office Action", U.S. Appl. No. 13/418,884, Jun. 16, 2014, 8 pages.
"Notice of Allowance", U.S. Appl. No. 13/712,777, Jul. 2, 2014, 4 pages.
"Final Office Action", U.S. Appl. No. 12/480,969, (Jul. 24, 2013),19 pages.
"Foreign Office Action", Chinese Application No. 200980142644.1, (Aug. 20, 2013), 9 pages.
"Foreign Office Action", Chilean Application No. 2379-2011, (Jul. 3, 2013), 8 pages.
"Foreign Office Action", Chinese Application No. 200980139831.4, (Jul. 1, 2013), 12 pages.
"Foreign Office Action", Japanese Application No. 2012-503523, (Apr. 22, 2013), 5 pages.
"Non-Final Office Action", U.S. Appl. No. 12/469,480, (Aug. 27, 2013), 22 pages.
"Supplemental Notice of Allowance", U.S. Appl. No. 12/433,667, (Aug. 1, 2013), 2 pages.
"Extended European Search Report", EP Application No. 10762120.3, Aug. 22, 2014, 9 pages.
"Final Office Action", U.S. Appl. No. 12/560,081, Aug. 25, 2014, 27 pages.
"Foreign Notice of Allowance", JP Application No. 2012-511905, Sep. 24, 2014, 4 pages.
"Foreign Notice of Allowance", RU Application No. 2011147058, May 23, 2014, 13 pages.
"Foreign Office Action", CN Application No. 201080027409.2, Aug. 5, 2014, 12 Pages.
"Non-Final Office Action", U.S. Appl. No. 13/461,656, Aug. 8, 2014, 27 pages.
"Notice of Acceptance", AU Application No. 2010260165, Jun. 23, 2014, 3 Pages.
"Notice of Allowance", U.S. Appl. No. 13/418,884, Aug. 5, 2014, 4 pages.
Faaborg, "The Design Review Episode 2: Chromeless Browsing", Available at: http://vimeo.com/2836740, Jan. 15, 2009, 3 pages.
"EP Search Report", European Application No. 10762112.0, (Aug. 2, 2013), 7 Pages.
"Final Office Action", U.S. Appl. No. 12/469,458, (Oct. 11, 2013), 24 pages.
"Foreign Office Action", Chinese Application No. 200980142661.5, (Sep. 24, 2013), 8 pages.
"Foreign Office Action", Chinese Application No. 201080015802.X, (Sep. 29, 2013), 11 Pages.
"Foreign Office Action", Japanese Application No. 2011-530109, (Jul. 18, 2013), 4 Pages.
"Foreign Office Action", Japanese Application No. 2011-533353, (Jul. 5, 2013), 9 Pages.
"Foreign Office Action", Japanese Application No. 2012-503514, (Aug. 7, 2013), 5 Pages.
"Non-Final Office Action", U.S. Appl. No. 12/414,476, (Oct. 25, 2013), 18 pages.
"Non-Final Office Action", U.S. Appl. No. 12/480,969, (Oct. 29, 2013), 22 pages.
"Non-Final Office Action", U.S. Appl. No. 13/270,111, (Oct. 21, 2013), 9 pages.

(56) References Cited

OTHER PUBLICATIONS

"Non-Final Office Action", U.S. Appl. No. 13/418,884, (Sep. 30, 2013), 7 pages.

"Supplemental Notice of Allowance", U.S. Appl. No. 12/433,667, (Oct. 10, 2013), 2 pages.

"Final Office Action", U.S. Appl. No. 12/480,969, Feb. 21, 2014, 21 pages.

"Foreign Office Action", AU Application No. 2010234909, Mar. 17, 2014, 4 Pages.

"Foreign Office Action", CN Application No. 200980142644.1, Mar. 5, 2014, 7 Pages.

"Foreign Office Action", JP Application No. 2012-511905, Jan. 28, 2014, 6 Pages.

"Foreign Office Action", JP Application No. 2011-533280, Nov. 26, 2013, 4 Pages.

"Foreign Office Action", RU Application No. 2011147058, Feb. 12, 2014, 6 Pages.

"Non-Final Office Action", U.S. Appl. No. 13/418,884, Mar. 10, 2014, 8 pages.

"Non-Final Office Action", U.S. Appl. No. 13/712,777, Mar. 20, 2014, 7 pages.

"Notice of Allowance", U.S. Appl. No. 13/270,111, Mar. 7, 2014, 6 pages.

"Foreign Office Action", IL Application No. 215757, May 18, 2015, 6 Pages.

"Foreign Office Action", TW Application No. 98135986, Jun. 10, 2015, 13 Pages.

"Notice of Allowance", U.S. Appl. No. 12/560,081, Aug. 10, 2015, 15 pages.

"Notice of Allowance", U.S. Appl. No. 13/461,656, Aug. 24, 2015, 4 pages.

\* cited by examiner

500 ⟶

502
Configure a user interface to include a plurality of representations of content arranged according to a plurality of columns that permit navigation between first and second columns upon detection of a gesture input via a touchscreen of the mobile communications device

504
Display the user interface on a display device of the mobile communications device in which the first column is configured for vertical navigation through each of the plurality of representations and the second column includes a filtered subset of the plurality of representations such that at least one representation is included in the first column and not the second column

702
Configure representations of contacts in a first column to have a font size that is larger than a font size of representations of contacts in the second column

704
if a pan gesture is detected by the mobile communications device, display the representations in the first and second columns as having a matching font size

*Fig. 7*

COLUMN ORGANIZATION OF CONTENT

RELATED APPLICATIONS

This application claims priority under 35 U.S.C. Section 120 as a continuation of U.S. patent application Ser. No. 12/469,419, filed May 20, 2009 which claims priority to 35 U.S.C. Section 119(e) to U.S. Provisional Patent Application Nos. 61/107,945, 61/107,935, and 61/107,921, each of which was filed on Oct. 23, 2008, the entire disclosures of which are hereby incorporated by reference.

BACKGROUND

Mobile communication devices (e.g., wireless phones) have become an integral part of everyday life. However, the form factor employed by conventional mobile communications devices is typically limited to promote mobility of the mobile communications device.

For example, the mobile communications device may have a relatively limited amount of display area when compared to a conventional desktop computer, e.g., a PC. In another example, the mobile communications device may have limited input functionality (e.g., a keyboard having a reduced size) when compared with a conventional desktop computer. Therefore, conventional techniques used to interact with a desktop computer may be inefficient when employed by a mobile communications device.

SUMMARY

Column organization of content is described. In an implementation, a mobile communications device configures a user interface to include a plurality of representations of content arranged according to a plurality of columns that permits navigation between first and second said columns upon detection of a gesture input via a touchscreen of the mobile communications device. The user interface is displayed on a display device of the mobile communications device. The first column is configured for vertical navigation through each of the plurality of representations and the second column includes a filtered subset of the plurality of representations such that at least one of the representations is included in the first column and not the second column.

In an implementation, a mobile communications device includes a display device and one or more modules to display representations of content in a first column on the display device as separated by a space from a concurrent display of partial representations of content in a second column. If a gesture is detected via touchscreen functionality of the display device that involves interaction with the space, representations of content in the second column are displayed concurrently with partial representations of content in the first column.

In an implementation, one or more computer-readable media include instructions that are executable by a mobile communications device to configure representations of contacts in a first column to have a font size that is larger than a font size of representations of contacts in the second column. If a pan gesture is detected by the mobile communications device, the representations in the first and second columns are displayed as having a matching font size.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 5 is a flow diagram depicting a procedure in an example implementation in which a user interface is configured to include a plurality of representations displayed in columns, at least one of which includes a filtered subset of representations.

FIG. 7 is a flow diagram depicting a procedure in an example implementation in which representations are displayed as having a matching font size in response to detection of a pan gesture.

DETAILED DESCRIPTION

Overview

Users sometimes desire access to related sets of content, such as family pictures, pictures taken in a particular date range (e.g., of a trip), and so on. However, in a traditional hub-and-spoke system that is used to organize content, navigation is typically performed to an item of content and then "back out" to get to another item of content. This may be inefficient and result in user frustration especially when performing this navigation on devices that have a limited amount of display area, such as a mobile communications device.

Column organization of content is described. In an implementation, representations of content are arranged in vertical columns that are accessible "next to each other" along a horizontal axis. Therefore, a user may scroll through representations of content vertically in each of the columns and navigate horizontally between the columns. Further, the columns may be configured in the user interface to include a space (e.g., a "gutter") between the columns. Selection of the space via a gesture (e.g., a tap on a touchscreen) may cause the next column to be displayed. Therefore, navigation may be performed between the columns without adding chrome (e.g., a display of a button) to the user interface, further discussion of which may be found in relation to FIGS. 2-3.

Additionally, the columns may be configured in a variety of ways. For example, filtering may be employed to separate the representations into groups. A first column, for instance, may include each contact from a user's contact list. A second column may include contacts for a social network, while a third column may include contacts for instant messaging. Thus, filtering may be used such that a user may navigate through successive columns of content that is filtered according to different criteria to locate content of interest. Further discussion of filtering may be found in relation to FIG. 5.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
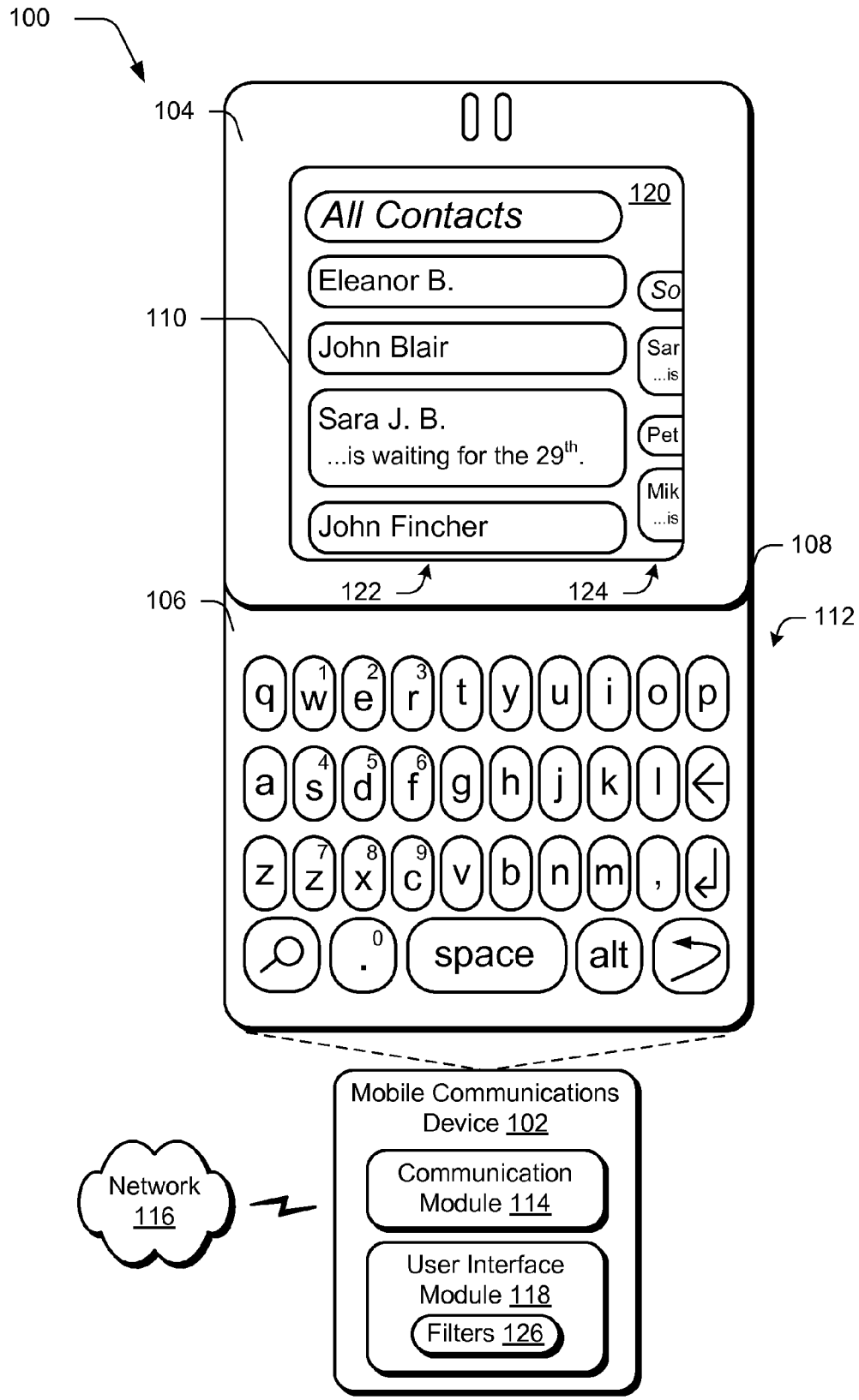
FIG. 1 is an illustration of an example implementation of a mobile communications device in accordance with one or more embodiments of devices, features, and systems for mobile communications.
Figure 2:
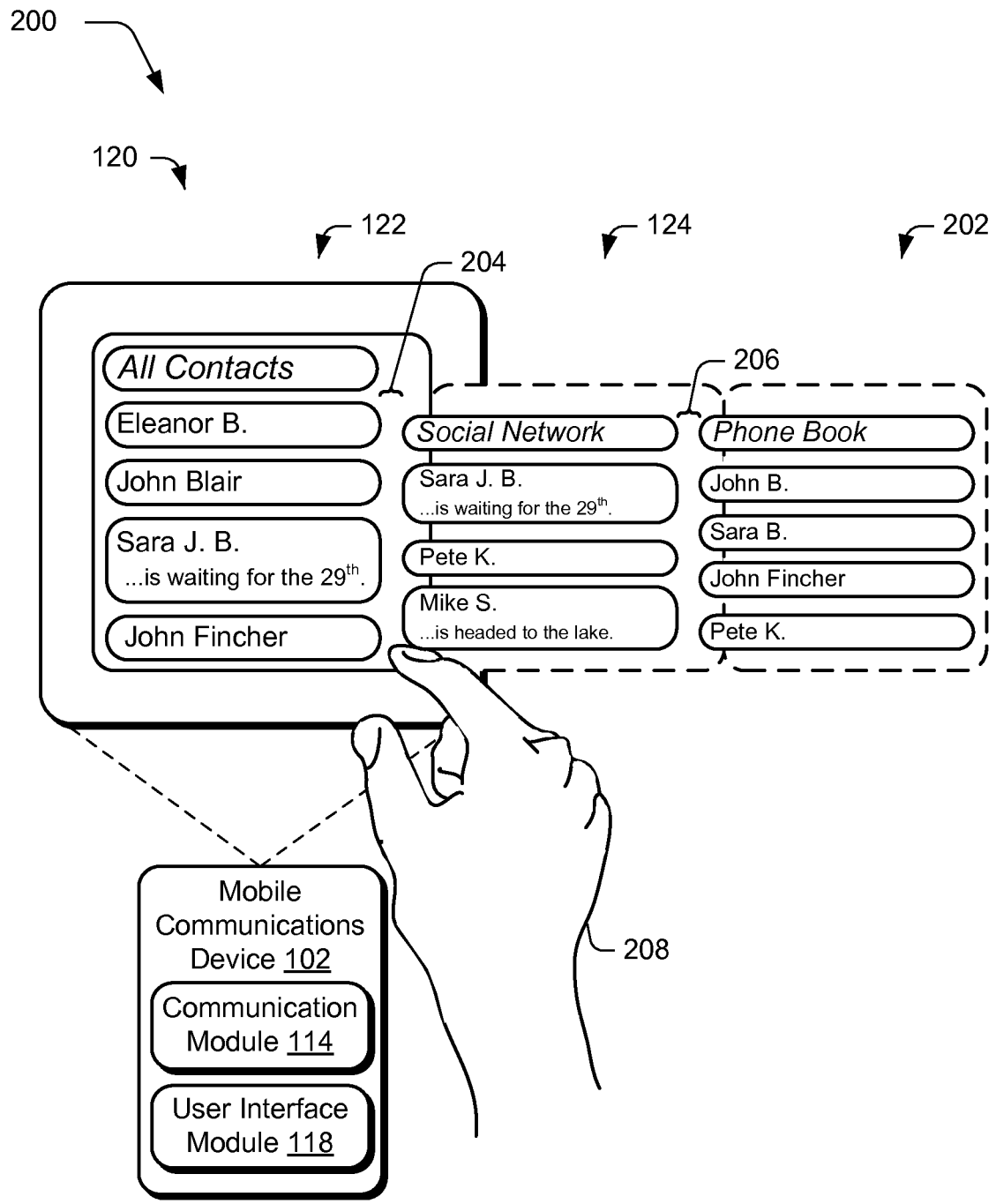
FIG. 2 is an illustration of a system in an example implementation in which detection of a gesture is used to navigate between first and second columns in a user interface of FIG. 1.
Figure 3:
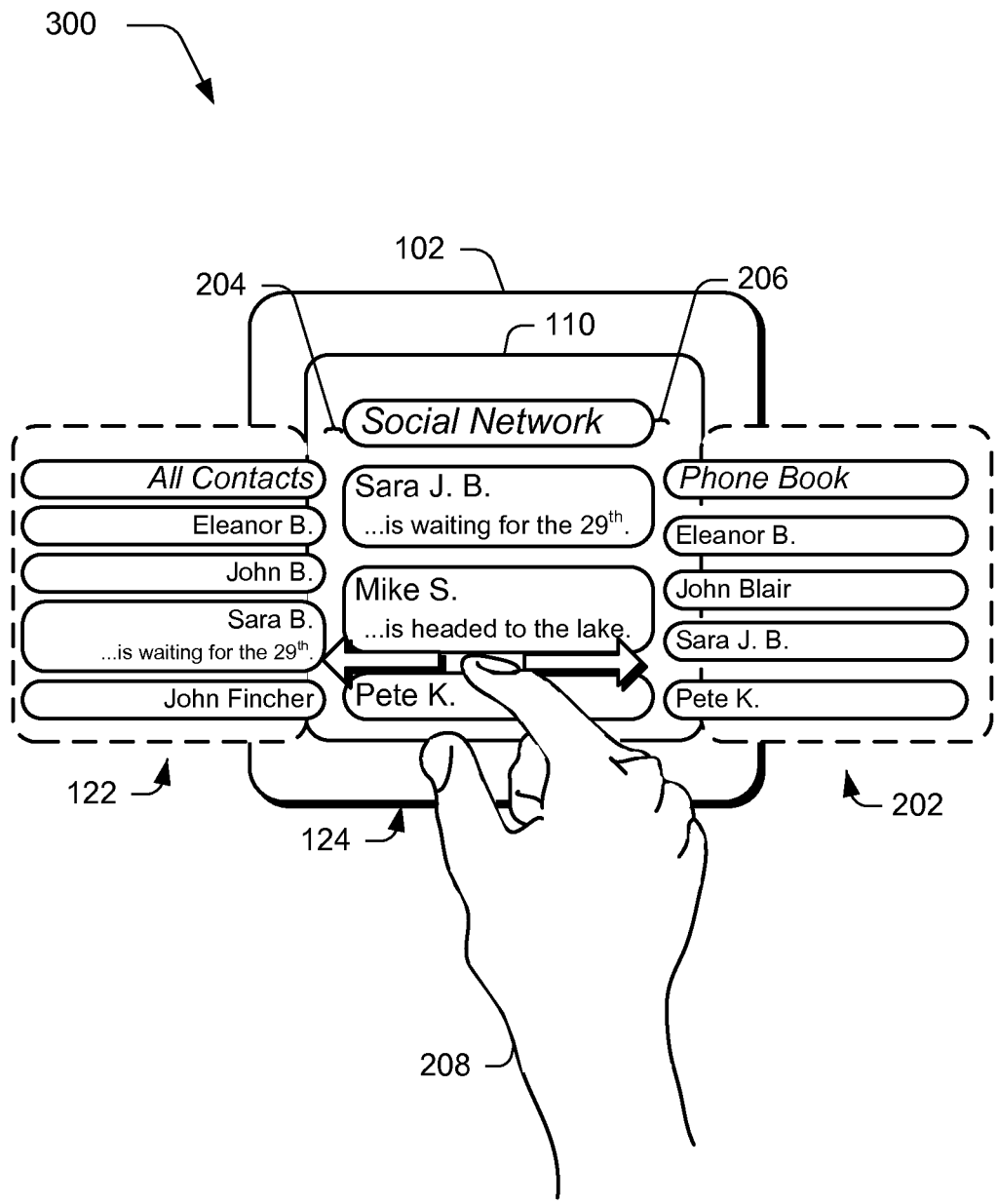
FIG. 3 is an illustration of a system in an example implementation in which the second column of the user interface that was selected through interaction with a space by a gesture of FIG. 2 is output in the user interface.
Figure 4:
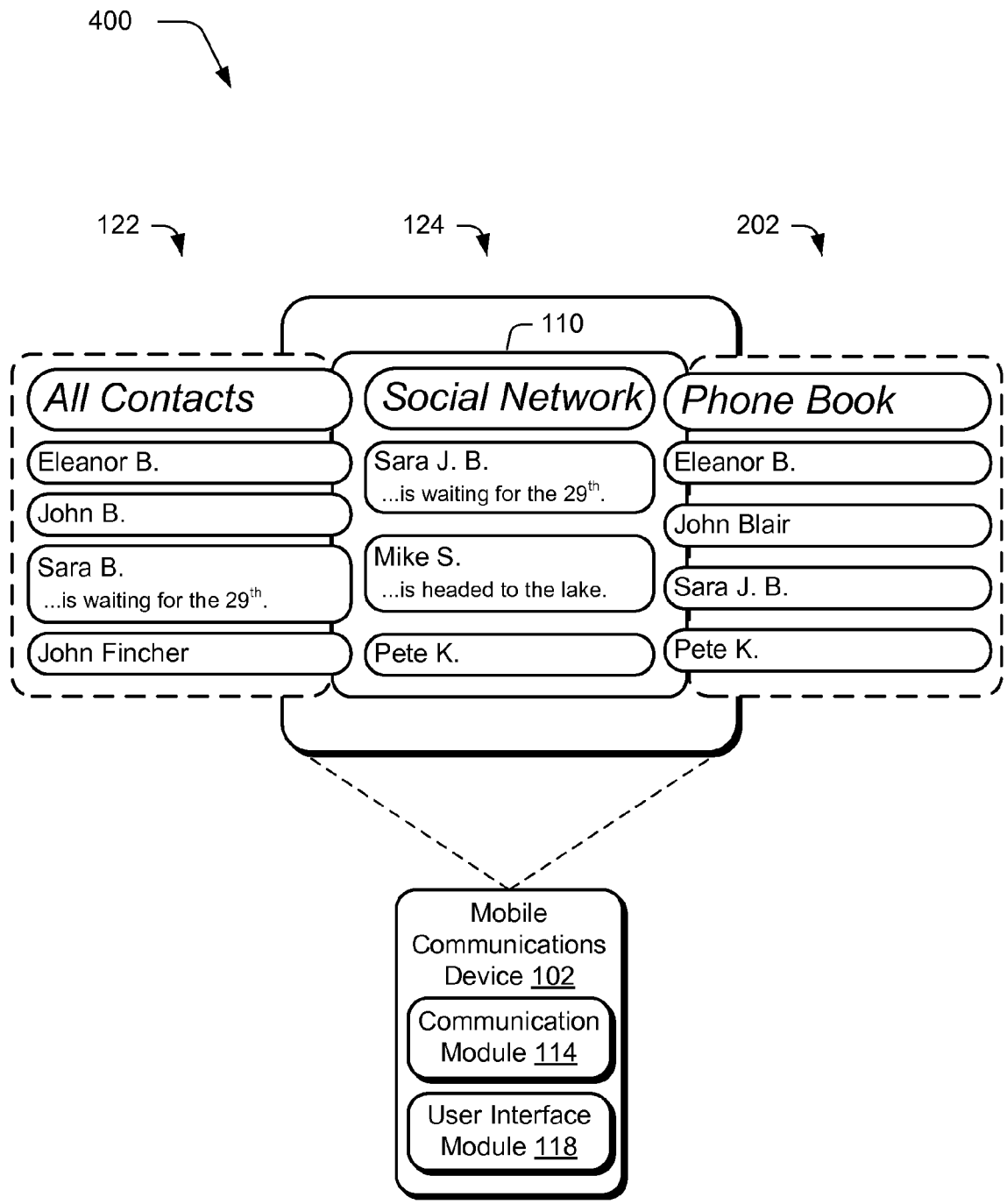
FIG. 4 illustrates an example system in which representations of content in a plurality of columns are displayed as having a matching font size in response to detection of a gesture of FIG. 3.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIGS. 2-4.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on. Additionally, configurations are also contemplated in which movement is not performed, such as a "brick" configuration.

The first housing 104 includes a display device 110 that may be used to output a variety of data, such as a caller identification (ID), representations of content (e.g., contacts) as illustrated, email, multimedia messages, Internet browsing, game play, music, video and so on. In an implementation, the display device 110 may also be configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 (i.e., the physical keys) is exposed such that the exposed keys are available for use to provide inputs. The open configuration results in an extended form factor of the mobile communications device 102 as contrasted with the form factor of the mobile communications device 102 in the closed configuration of FIGS. 2-4. In an implementation, the planes of the first and second housings 104, 106 that are used to define the extended form factor are parallel to each other. Other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. A user, for instance, may input a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110. A variety of different techniques may be employed to generate the user interface 120.

For example, the user interface module 118 may configure the user interface 120 to arrange representations of content into vertical columns, an example of which is shown by first and second columns 122, 124 in the user interface 120. Thus, a user may scroll vertically through the first column 122 to locate a representation of interest, which in this instance is a contact from an "All Contacts" column.

The user interface module 118 may also employ one or more filters 126 to filter representations that are included in one or more of the columns. For instance, in some applications there may exist subsets of content that may be used to quickly identify the representations in that subset. By navigating between the subsets, a user may first identify a subset that is likely to contain the content of interest and then navigate through the reduced subset of representations.

Continuing with the previous example, the first column 122 includes representations of each contact included in a user's contacts list, e.g., which may be stored on the mobile communications device 102. The second column 124 may then contain a subset of contacts that correspond to a criteria used to filter the contacts, such as contacts that belong to a social network. Filtering may be continued for subsequent columns, such as for contacts that support text messaging, include email addresses, have phone numbers (e.g., a telephone book), identified as business contacts (e.g., business phone numbers and addresses), and so on. Thus, navigation may be performed horizontally through the user interface through different column for subsets of content to locate content of interest.

In the illustrated implementation of the user interface 120 of FIG. 1, complete representations are illustrated for the first column 122 and partial representations are illustrated for the second column 124. For instance, the representations in the first column 122 are displayed having their full width while the partial representations of the second column 124 are truncated at an edge of the display device 120 and thus display a partial width in the user interface 120. Using this technique, a user is readily made aware as to the availability of the second column 124 "to the right" of the first column 122 in the user interface 120 without consuming a significant portion of the available display area of the display device 110. Navigation may be performed to the second column 124 in a variety of ways, further discussion of which may be found in relation to the following figure.

FIG. 2 illustrates a system 200 in an example implementation in which detection of a gesture is used to navigate between first and second columns 122, 124 in the user interface 120. The mobile communications device 102 is illustrated as displaying a user interface 120 on the display device 110, which includes the full width of representations in the first column 122 and partial representations in the second column 124 as previously illustrated in FIG. 1. However, the entire width the representations of the second column 124 and a third column 202 are illustrated in phantom "off" the display device 110 to give context as to an arrangement of the first, second, and third columns 122, 124, 202 in the user interface 120.

The first and second columns 122, 124 (and more particularly representations included in the respective columns) are illustrated as separated by a space 204. Likewise, the second and third columns 124, 202 are also illustrated as separated by a space 206. In the illustrated implementation, the space 204 is configured for use in chromeless navigation between the first and second columns 122, 124. Likewise, space 206 is configured for use in navigation between the second and third columns 124, 202.

In an implementation, the user interface module 118 is configured to detect a gesture input via touchscreen functionality of the display device 110. For example, a finger of a user's hand 208 may tap the space 204 between the first and second columns 122, 124. Upon detection of this gesture (the tap), the user interface module 118 causes the second column 124 to be displayed in the user interface 120, an example of which is shown in the following figure.

FIG. 3 illustrates a system 300 in an example implementation in which the second column 124 that was selected through interaction with the space 204 by the gesture of FIG. 2 is output in the user interface 120. The user interface 120 includes the first, second, and third columns 122, 124, 202 of FIG. 2. In this instance, however, the second column 124 is displayed on the display device 110 as having one or more representations that are displayed in their entirety, e.g., has a full width for representations even though each of the representations in the column might not be displayed concurrently (e.g., for vertical scrolling). The first and third columns 124, 202 are displayed with partial representations to indicate "where" the respective columns are located in relation to the second column 124. Thus, a user may readily ascertain "where" the first and third columns 124, 202 are positioned in relation to the second column 124.

In FIG. 3, like FIG. 2, the column that is in "focus" (e.g., the second column 124 in FIG. 3 and the first column 122 in FIGS. 1 and 2) is displayed as having representations that have a greater height than representations in columns that are not displayed in their entirety, i.e., partial representations of the second column 124 in FIGS. 1 and 2 and the first and third columns 122, 202 of FIG. 3. For example, the representations of the second column 124 are displayed as having a greater font size than the font size of the representations of the first and third columns 122, 202. Additionally, the representations of the first column 122 are illustrated as being realigned (e.g., text of the representations is right justified in FIG. 3 as opposed to left justified in FIGS. 1 and 2) to aid in the descriptions provided by the respective representations. It should be readily apparent, however, that such realignment may not be performed in a variety of instances, such as to conserve processing and/or display resources.

Therefore, in addition to the truncation of the representations of the first and third columns to show "where" the columns are located in relation to the second column 124, the first and third columns 122, 202 are also displayed with a reduced height such that a lesser amount of display area of the display device 110 is consumed by those columns. Thus, this technique may also help to increase focus given to the second column 124 being displayed yet still provide an awareness of "where" the user is located in the user interface 120.

A user may continue to navigate through the columns by selecting successive spaces to the "right" in this example to navigate to respective columns, e.g., space 206 to navigate to the third column 202 and so on. Additionally, the user may navigate "back" through the columns by selecting spaces to the left of the currently displayed column (e.g., space 204 to the left of the second column 124) in the user interface 120 in this example. In some instances, however, the user may wish to quickly scroll through the columns without interacting with each of the spaces. This navigation may be performed in a variety of ways.

For example, the user's hand 208 may make a pan gesture by placing a finger on the display device 110 and moving the finger to the left and/or right in this example, although other examples are also contemplated. Touchscreen functionality of the display device 110 (or other device such as a track pad) may then be used to communicate data to the user interface module 118 that describes this gesture. In response, the user interface module 118 may configure the user interface 120 to assume a mode in which representations of content are displayed in a matching size, e.g., the font size of the representations of the content matches between columns. Additionally, the user interface module 118 may configure identifiers of the columns to have an increased size such that a user may navigate through the columns in a quicker manner to locate a column of interest, further discussion of which may be found in relation to the following figure.

FIG. 4 illustrates an example system 400 in which representations of content in a plurality of columns are displayed as having a matching font size in response to detection of a gesture of FIG. 3. In this example system 400, the first, second, and third columns 122, 124, 202 are configured to have a matching font size. For example, the font size of the columns located "off" the display device 110 may be configured to match the column that is in focus. Additionally, identifiers of each of the columns (e.g., "All Contacts" for the first column 122, "Social Network" for the second column 124, and "Phone Book" for the third column 202) may have an increased size (e.g., a larger font size) to improve legibility.

When in this mode the columns may be panned to locate a particular column of interest. Selecting the column (e.g., tapping on the identifier and/or representations in the column) may cause the user interface module 118 to display the selected column "in focus" as shown for the first column 122 in FIG. 1 and the second column 124 in FIGS. 2 and 3. In an implementation, when in this "zoomed out" mode the columns may be navigated by a pan gesture and/or selecting the space as previously described in relation to FIG. 2. Further, in an implementation the representations in the columns are not selectable in and of themselves to navigate to corresponding content. Rather, focus is first given to the column through the first selection, which may then permit selection of a particular column. It should be readily apparent that other implementations are also contemplated without departing from the spirit and scope thereof, such to enable selection of representations in both modes.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-400 of FIGS. 1-4, respectively.

FIG. 5 depicts a procedure 500 in an example implementation in which a user interface is configured to include a plurality of representations for display in columns, at least one of which includes a filtered subset of representations. A user interface is configured to include a plurality of representations of content arranged according to a plurality of columns that permit navigation between first and second columns upon detection of a gesture input via a touchscreen of the mobile communications device (block 502). For example, a user may "tap" the space 204 between the first and second columns 122, 124 to navigate to the second column 124.

The user interface is displayed on a display device of the mobile communications device in which the first column is configured for vertical navigation through each of the plurality of representations and the second column includes a filtered subset of the plurality of representations such that at least one representation is included in the first column and not the second column (block 504). For example, a pan gesture may involve placing a finger of the user's hand 208 on a surface of the display device 110 and dragging the finger across the surface. The user interface module 118 may then detect this gesture and cause the user interface 120 to move in a direction that follows the movement of the finger. Therefore, a pan gesture that involves dragging the finger of the user's hand 208 "up" in the illustrated system 200 to cause representations included in a column "below" a current view to be displayed.

Figure 6:
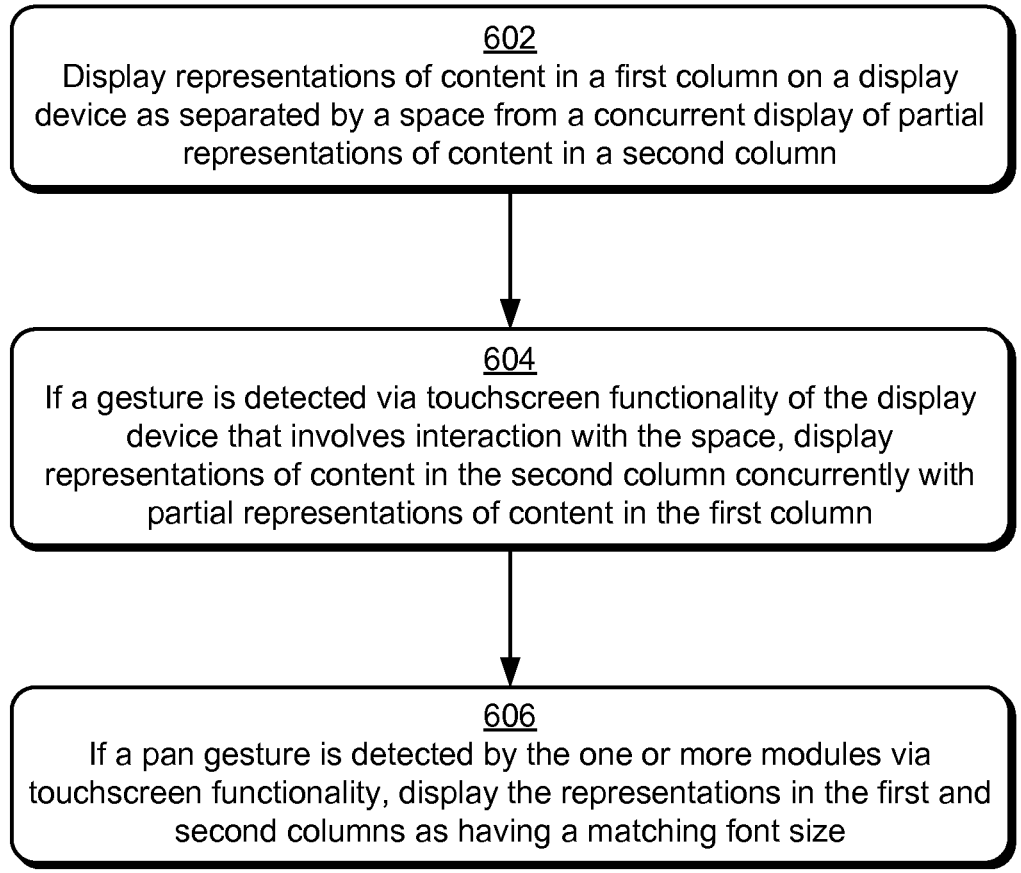
FIG. 6 is a flow diagram depicting a procedure in an example implementation in which a gesture that involves interaction with a space is used to navigate between columns of representations.

FIG. 6 depicts a procedure 600 in an example implementation in which a gesture that involves interaction with a space is used to navigate between columns of representations. Representations of content are displayed in a first column on a display device as separated by a space from a concurrent display of partial representation of content in a second column (block 602). As described previously in relation to FIG. 2, for instance, the spaces 204, 206 may be used to separate representations of content in the first, second, and third columns 122, 124, 202.

If a gesture is detected via touchscreen functionality of the display device that involves interaction with the space, representations of content in the second column are displayed concurrently with partial representations of content in the first column (block 604). Like above, a user may "tap" the space 204 between the first and second columns 122, 124 to navigate to the second column 124.

If a pan gesture is detected by the one or more modules via touchscreen functionality, the representations in the first and second columns are displayed as having a matching font size (block 606). For example, a horizontal pan gesture may be detected that involves dragging a finger of the user's hand 208 horizontally across the display device. When this gesture is detected, the representations may be displayed as having substantially similar sizes, an example of which may be found in relation to FIG. 4.

FIG. 7 depicts a procedure 700 in an example implementation in which representations are displayed as having a matching font size in response to detection of a pan gesture. Representations of contacts are configured in a first column to have a font size that is larger than a font size of representations of contacts in a second column (block 702). As shown in FIG. 1, for instance, the font size of representations in the first column 122 is larger than the font size of representations in the second column 124.

If a pan gesture is detected by the mobile communications device, display the representations in the first and second columns as having a matching font size (block 704). An example of this is shown in FIG. 4 in which the representations of content (contacts in this instance) have a matching font size.

Example Device

Figure 8:
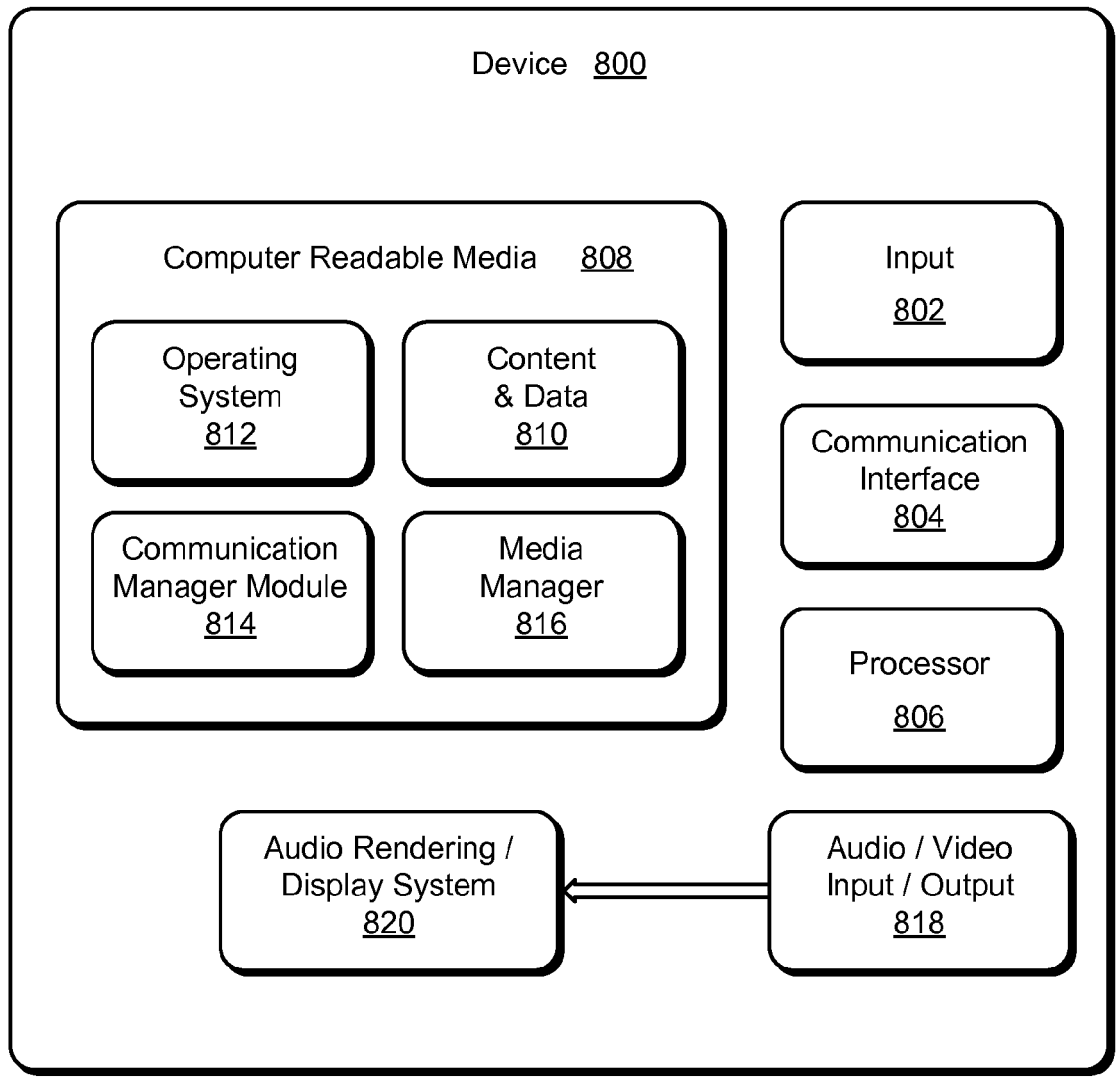
FIG. 8 illustrates various components of an example device that can be implemented in various embodiments as any type of a mobile device to implement embodiments of devices, features, and systems for mobile communications.

FIG. 8 illustrates various components of an example device 800 that can be implemented in various embodiments as any type of a mobile device to implement embodiments of devices, features, and systems for mobile communications. For example, device 800 can be implemented as any of the mobile communications devices 102 described with reference to respective FIGS. 1-4. Device 800 can also be implemented to access a network-based service, such as a social network service.

Device 800 includes an input 802 that may include Internet Protocol (IP) inputs as well as other input devices, such as the keyboard 112 of FIG. 1. Device 800 further includes a communication interface 804 that can be implemented as any one or more of a wireless interface, any type of network interface, and as any other type of communication interface. A network interface provides a connection between device 800 and a communication network by which other electronic and computing devices can communicate data with device 800. A wireless interface enables device 800 to operate as a mobile device for wireless communications.

Device 800 also includes one or more processors 806 (e.g., any of microprocessors, controllers, and the like) which process various computer-executable instructions to control the operation of device 800 and to communicate with other electronic devices. Device 800 can be implemented with computer-readable media 808, such as one or more memory components, examples of which include random access memory (RAM) and non-volatile memory (e.g., any one or more of a read-only memory (ROM), flash memory, EPROM, EEPROM, etc.).

Computer-readable media 808 provides data storage to store content and data 810, as well as device applications and any other types of information and/or data related to operational aspects of device 800. For example, an operating system 812 can be maintained as a computer application with the computer-readable media 808 and executed on processor(s) 806. Device applications can also include a communication manager module 814 (which may be used to provide telephonic functionality) and a media manager 816.

Device 800 also includes an audio and/or video output 818 that provides audio and/or video data to an audio rendering and/or display system 820. The audio rendering and/or display system 820 can be implemented as integrated components of the example device 800, and can include any components that process, display, and/or otherwise render audio, video, and image data. Device 800 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile communications device comprising:
a display device; and
one or more modules implemented at least partially in hardware using a processor and memory to:
configure a user interface to include a plurality of representations of content arranged according to a plurality of columns, separated by a space, that permits navigation between first and second said columns upon detection of a gesture input via a touchscreen of the display device the mobile communications device; and
display the user interface on the display device of the mobile communications device in which:
the first said column is configured for vertical navigation through each of the plurality of representations; and
the second said column includes a filtered subset of the plurality of representations such that at least one said representation is included in the first said column and not the second said column.

2. A mobile communications device as described in claim 1, wherein said representations that are accessible via the second said column are also accessible via the first said column.

3. A mobile communications device as described in claim 1, wherein the displaying is performed such that:
an entire width of one or more said representations included in the first said column is displayed on the display device;
a portion of a width of at least one said representation included in the second said column is displayed concurrently on the display device with the first said column; and
the one or more representations of the first said column are separated by a space from the portion of the at least one said representation of the second said column.

4. A mobile communications device as described in claim 3, wherein the gesture includes a tap of the space between the first and second said columns.

5. A mobile communications device as described in claim 1, wherein the gesture is not a pan gesture.

6. A mobile communications device as described in claim 1, wherein the user interface is further configured by the mobile communications device such that detection of a pan gesture causes the representations arranged in the plurality of columns to be displayed to have a substantially similar width.

7. A mobile communications device as described in claim 1, wherein representations in the first said column have a font size that is larger than a font size of representations in the second said column.

8. A mobile communications device as described in claim 7, wherein the user interface is further configured by the mobile communications device such that detection of a pan gesture causes the representations arranged in the plurality of columns to employ a substantially similar font size.

9. A mobile communications device as described in claim 1, wherein the content is contact information.

10. A device comprising:
a display device; and
one or more modules implemented at least partially in hardware using a processing system and memory to:
display representations of content in a first column on the display device as separated by a space from a concurrent display of partial representations of content in a second column; and
responsive to a gesture being detected via touchscreen functionality of the display device that involves interaction with the space, display representations of content in the second column concurrently with partial representations of content in the first column.

11. A device as described in claim 10, wherein the representations of content displayed as the partial representations of content are truncated at an edge of the display device.

12. A device as described in claim 10, wherein the representations of content in the first and second columns correspond to a matching level of a hierarchical file system.

13. A device as described in claim 10, wherein the interaction is a tap of the space.

14. A device as described in claim 10, wherein:
the representations of content in the first column have a font size that is larger than a font size of representations of content in the second column; and
responsive to a pan gesture being detected by the one or more modules via touchscreen functionality, display the representations of content in the first and second columns as having a matching font size.

15. A device as described in claim 10, wherein:

the display is performed by the one or more modules before the gesture is detected such that the partial representations of content in the second column are displayed concurrently with complete representations of the content in the first column; and the display is performed by the one or more modules after the gesture is detected such that the partial representations of content in the first column are displayed concurrently with complete representations of the content in the second column.

16. A mobile communications device comprising:

a display device; and one or more modules to implemented at least partially in hardware using a processor and memory to:

configure representations of contacts in a first column to have a font size that is larger than a font size of representations of contacts in the second column; and responsive to a gesture being detected by the mobile communications device, display the representations of contacts in the first and second columns as having a matching font size.

17. A mobile communications device as described in claim 16, wherein the representations of contacts in the first column are separated by a space from a concurrent display of the representations of contacts in the second column that are displayed partially such that at least a portion of the representations of contacts in the second column is truncated.

18. A mobile communications device as described in claim 17, wherein responsive to another gesture being detected that involves interaction with the space, display the representations of contacts in the second column concurrently with partial representations of content in the first column such that at least a portion of the representations of contacts in the first column is truncated.

19. A mobile communications device as described in claim 16, wherein the first column includes representations of each of a plurality of the contacts that are accessible via vertical scrolling and the second column includes a subset of the representations such that at least one said representation included in the first column is not included in the second column.

20. A mobile communications device as described in claim 16, wherein:

the first column is configured for vertical navigation through each of a plurality of the representations; and the second column includes a filtered subset of the plurality of the representations such that at least one said representation is included in the first column and not the second column.

* * * * *

UNITED STATES PATENT AND TRADEMARK OFFICE
CERTIFICATE OF CORRECTION

| | | |
|---|---|---|
| PATENT NO. | : 9,323,424 B2 | Page 1 of 1 |
| APPLICATION NO. | : 13/835603 | |
| DATED | : April 26, 2016 | |
| INVENTOR(S) | : Kruzeniski et al. | |

It is certified that error appears in the above-identified patent and that said Letters Patent is hereby corrected as shown below:

On the title page after item (72) insert item -- (73), Microsoft Technology Licensing, LLC --

Signed and Sealed this
Ninth Day of August, 2016

Michelle K. Lee
*Director of the United States Patent and Trademark Office*